United States Patent
Liao

(10) Patent No.: US 9,272,695 B2
(45) Date of Patent: Mar. 1, 2016

(54) ELECTRIC PARKING BRAKE

(71) Applicant: Chih-Hsien Liao, Taichung (TW)

(72) Inventor: Chih-Hsien Liao, Taichung (TW)

( * ) Notice: Subject to any disclaimer, the term of this patent is extended or adjusted under 35 U.S.C. 154(b) by 0 days.

(21) Appl. No.: 14/220,090

(22) Filed: Mar. 19, 2014

(65) Prior Publication Data

US 2015/0267767 A1  Sep. 24, 2015

(51) Int. Cl.
*F16D 55/08* (2006.01)
*F16D 65/18* (2006.01)
*B60T 13/74* (2006.01)
*F16D 55/226* (2006.01)
*F16D 121/24* (2012.01)
*F16D 125/40* (2012.01)

(52) U.S. Cl.
CPC ............ *B60T 13/741* (2013.01); *F16D 55/226* (2013.01); *F16D 65/18* (2013.01); *F16D 2121/24* (2013.01); *F16D 2125/40* (2013.01)

(58) Field of Classification Search
CPC ............... F16D 2055/0004; F16D 2055/0008; F16D 2055/007; F16D 2055/0016; F16D 55/224; F16D 55/226; F16D 55/2265; F16D 55/227; F16D 2121/24; F16D 2125/40; F16D 65/0056; F16D 65/0087; F16D 65/18
USPC ............. 188/72.1, 73.31, 73.43, 73.44, 73.45
See application file for complete search history.

(56) References Cited

U.S. PATENT DOCUMENTS

| | | | | |
|---|---|---|---|---|
| 4,191,278 | A | * | 3/1980 | Karasudani ................ 188/73.39 |
| 5,022,500 | A | * | 6/1991 | Wang ......................... 188/73.31 |
| 5,785,156 | A | * | 7/1998 | Warwick et al. ........... 188/73.44 |
| 6,725,981 | B1 | * | 4/2004 | Franz ......................... 188/73.45 |
| 7,249,658 | B2 | * | 7/2007 | Barrett et al. .............. 188/73.45 |
| 2004/0188191 | A1 | * | 9/2004 | Lintner ....................... 188/73.45 |

FOREIGN PATENT DOCUMENTS

| | | | | |
|---|---|---|---|---|
| JP | | 5740128 A | * | 3/1982 |
| JP | 200845703 A | | * | 2/2008 |

* cited by examiner

*Primary Examiner* — Melody Burch
(74) *Attorney, Agent, or Firm* — DLA Piper LLP (US)

(57) ABSTRACT

An electric parking brake includes an actuator, first and second linings adjacent respectively to first and second end surfaces of a brake disk, and first and second braking members. Through operation of the actuator, the first lining is driven by the first braking member to move toward or away from the first end surface in a direction to thereby move the second braking member toward or away from the second end surface in an opposite direction, so that the first and second linings can be moved toward each other to clamp the brake dish therebetween.

2 Claims, 6 Drawing Sheets

ELECTRIC PARKING BRAKE

BACKGROUND OF THE INVENTION

1. Field of the Invention

This invention relates to vehicle braking equipment, and more particularly to an electric parking brake.

2. Description of the Related Art

Electric parking brakes have been available, however, conventional electric parking brakes have a complicated structure.

SUMMARY OF THE INVENTION

The object of this invention is to provide an electric parking brake that has a simple structure.

According to this invention, an electric parting brake includes an actuator, first and second linings adjacent respectively to first and second end surfaces of a brake disk, and first and second braking members. Through operation of the actuator, the first lining is driven by the first braking member to move toward or away from the first end surface in a direction to thereby move the second braking member toward or away from the second end surface in an opposite direction, so that the first and second linings can be moved toward each other to clamp the brake disk therebetween.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
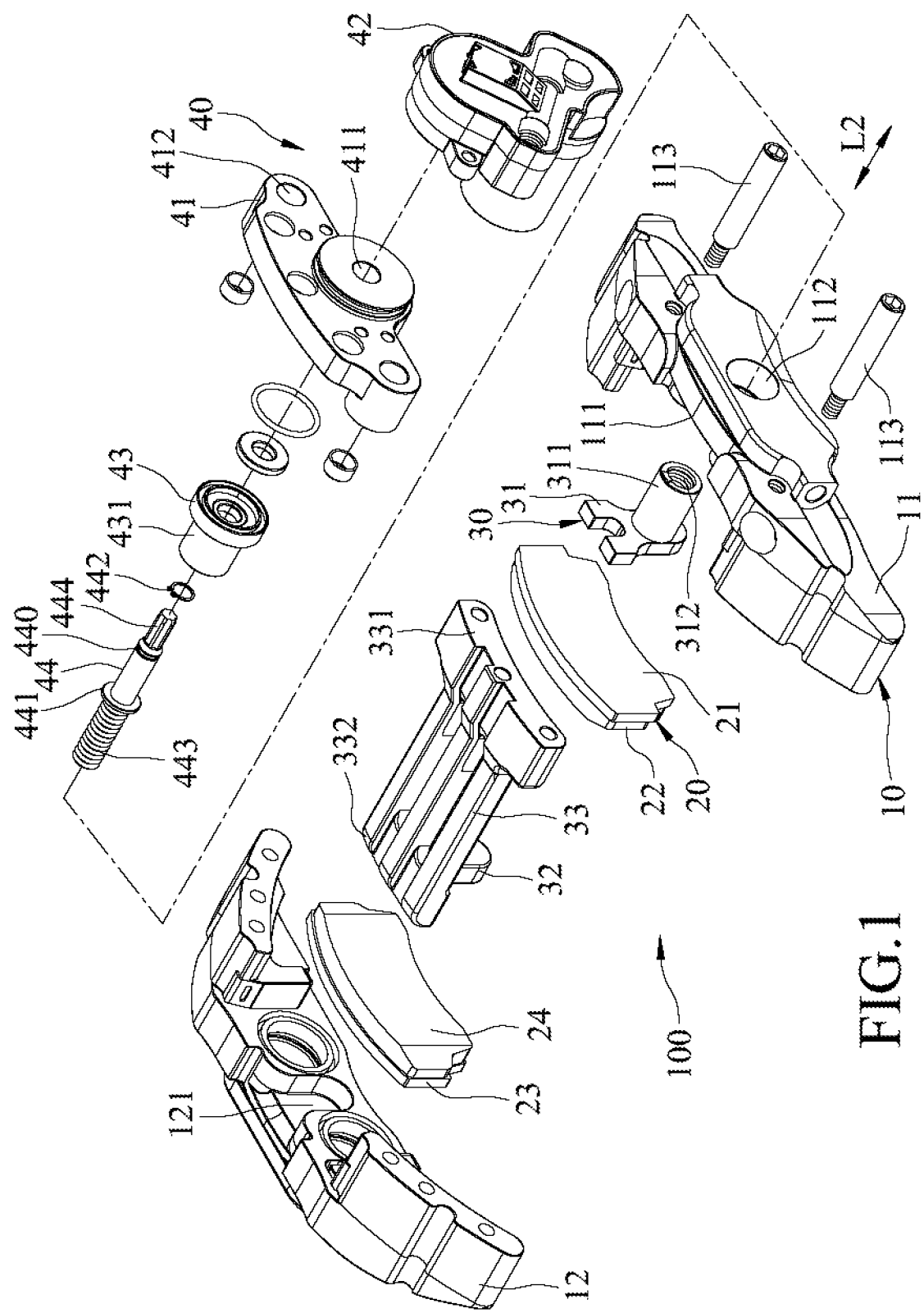
FIG. 1 is an exploded perspective view of the preferred embodiment of an electric parking brake according to this invention.
Figure 2:
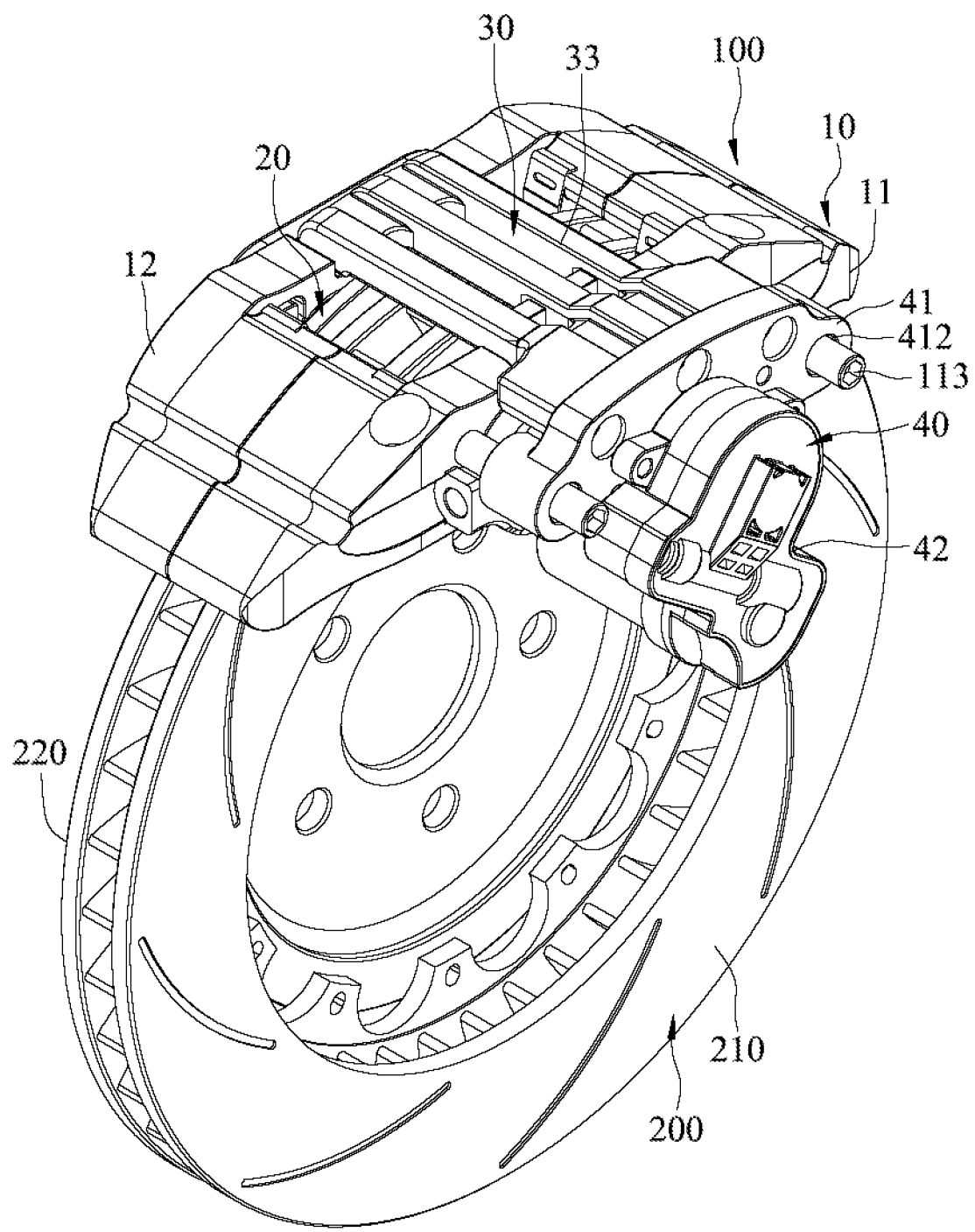
FIG. 2 is an assembled perspective view of the preferred embodiment.
Figure 3:
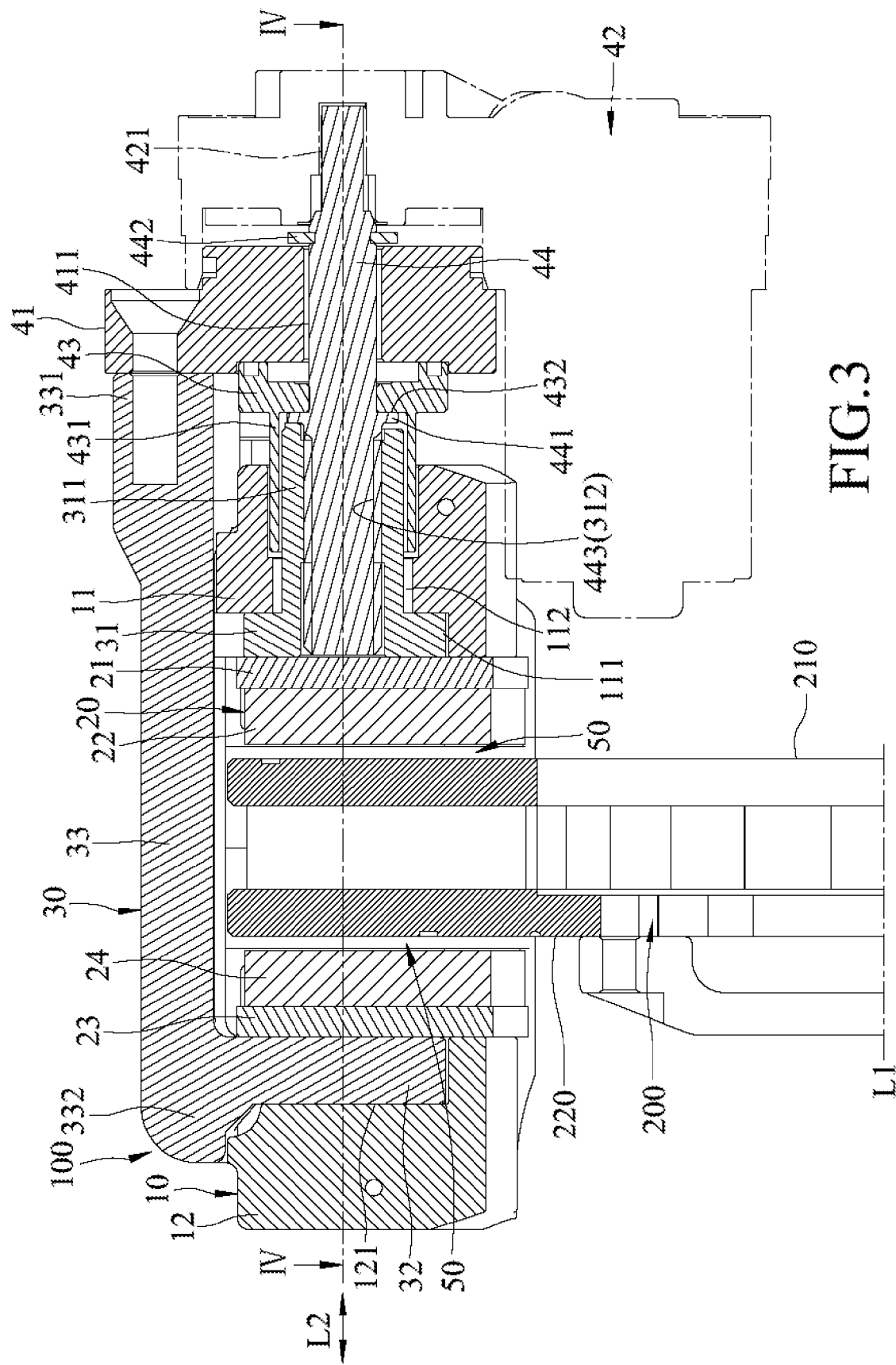
FIG. 3 is a schematic sectional view of the preferred embodiment, illustrating that first and second linings are not in contact with a brake disk.

Referring to FIGS. 1, 2, and 3, the preferred embodiment of an electric parking brake 100 according to this invention is used with a brake disk 200. The brake disk 200 has a rotating axis L1, and opposite first and second end surfaces 210, 220 perpendicular to the rotating axis L1. The electric parking brake 100 includes a main body unit 10, a lining unit 20, a braking unit 30, and an actuating unit 40.

Figure 4:
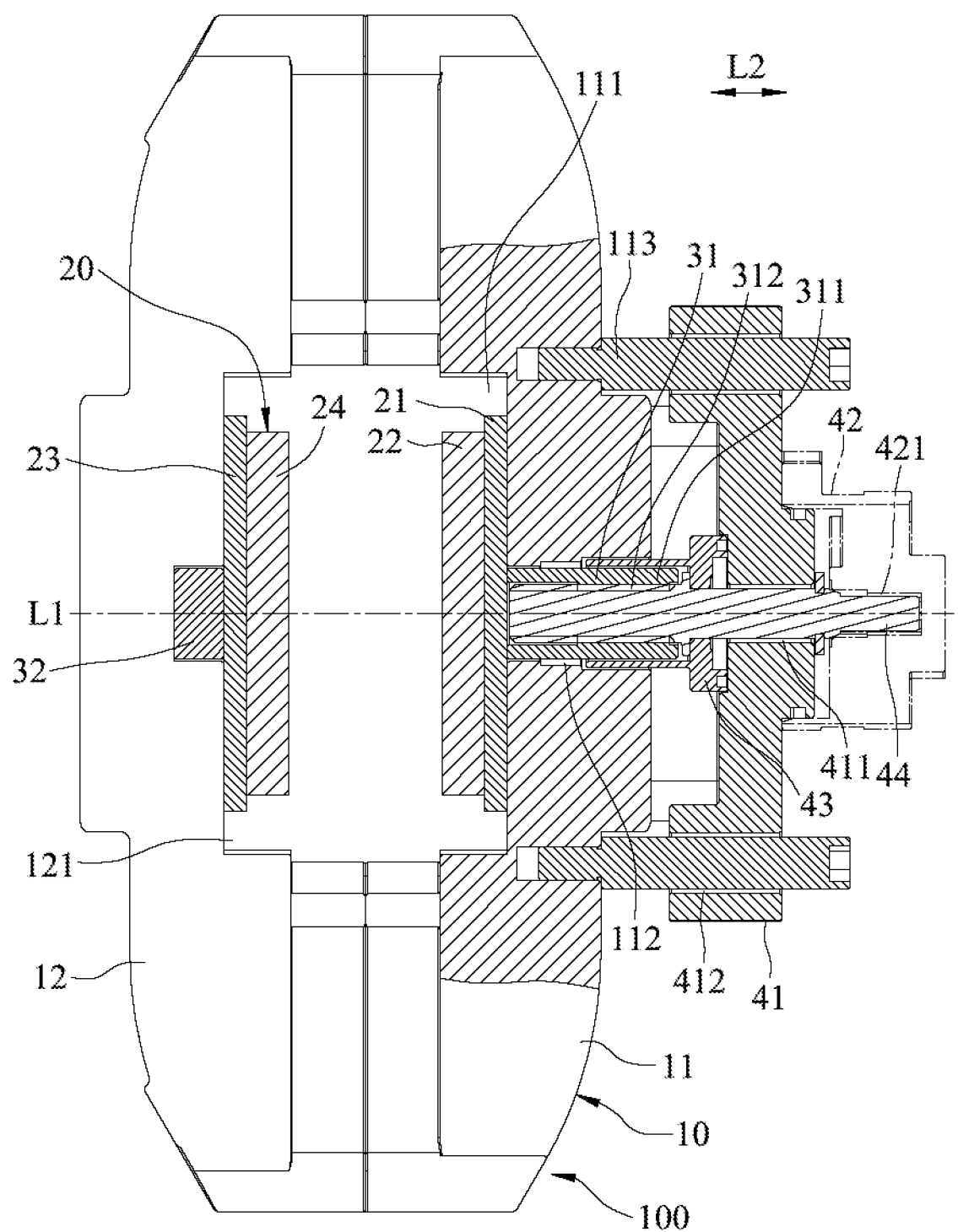
FIG. 4 is a sectional view taken along line IV-IV in FIG. 3.

The main body unit 10 includes first and second side seats 11, 12 located respectively at two sides of the brake disk 200 and adjacent respectively to the first and second end surfaces 210, 220. The first side seat 11 has an inner side surface facing toward the brake disk 200, an outer side surface opposite to the inner side surface and facing away from the brake disk 200, a first recess 111 formed in the inner side surface and disposed in proximity to the first end surface 210, a shaft hole 112 formed through the first side seat 11 and in spatial communication with the first recess 111, and two guide rods 113 extending along an axial direction L2 parallel to the rotating axis L1 and located respectively at two sides of the shaft hole 112. The guide rods 113 extends from the outer side surface of the first side seat 11 away from the first recess 111, as shown in FIG. 4. The second side seat 12 has a second recess 121 disposed in proximity to the second end surface 220.

The lining unit 20 includes a first positioning member 21 movable in the first recess 111 along the axial direction L2, a first lining 22 secured on the first positioning member 21, a second positioning member 23 movable in the second recess 121 along the axial direction L2, and a second lining 24 secured on the second positioning member 23. The first and second linings 22, 24 are adjacent respectively to the first and second end surfaces 210, 220.

The braking unit 30 includes a first braking member 31 movable in the first recess 111 long the axial direction L2, a second braking member 32 movable in the second recess along the axial direction L2, and a connecting member 33 connected to the second braking member 32. The first braking member 31 is disposed between the first side seat 11 and the first positioning member 21, and has an extension tube portion 311 and a threaded hole 312 formed in the extension tube portion 311. The second braking member 32 is disposed between the second side seat 12 and the second positioning member 23. In this embodiment, the second braking member 32 and the connecting member 33 are formed as one piece. The connecting member 33 has a first end 331 aligned with the first side seat 11, and a second end 332 opposite to the first end 331 and connected to the second braking member 32.

The actuating unit 40 includes a support 41 connected fixedly to the first end 331 of the connecting member 33, an actuator 42 mounted on the support 41, a bushing 43 disposed on the support 41 in such a manner that movement of the bushing 43 on the support 41 along the axial direction L2 is prevented, and a driving shaft 44 extending along the axial direction L2 and driven by the actuator 42 to move the first braking member 31 relative to the main body unit 10.

The support 41 has a circular hole 411 extending along the axial direction (L2), and two guide holes 412 located respectively at two sides of the circular hole 441.

The actuator 42 has a driving portion 421 aligned with the circular hole 412. In this embodiment, the actuator is a conventional assembly of a motor and a speed reduction unit, and the driving portion 421 has a non-circular hole.

The bushing 43 has a sleeve tube portion 431, and a flange 432 adjacent to an end of the sleeve tube portion 431. The extension tube portion 311 of the first braking member 31 extends into the sleeve tube portion 431 of the bushing 43.

The driving shaft 44 extends rotatably through the bushing 43 and the circular hole 411 in the support 41 along the axial direction L2. The driving shaft 44 has a shaft body 440, a flange 441 disposed at a middle portion of the shaft body 440 and abutting against the flange 432 of the bushing 43, and a C-shaped retaining ring 442 sleeved on the shaft body 440 and abutting against the support 41 to confine the flange 432 of the bushing 43 and the support 41 between the flange 441 of the driving shaft 44 and the C-shaped retaining ring 442 so as to prevent movement of the support 41 and the bushing 43 on the driving shaft 44. As such, synchronous movement of the flanges 432, 442 is allowed during rotation of the driving shaft 44. The shaft body 440 has a threaded portion 443 that is engaged into the threaded hole 312 in the first braking member 31, and a driven portion 444 having a non-circular cross-section and engaging fittingly the non-circular hole in the driving portion 421 of the actuator 42.

With particular reference to FIGS. 3 and 4, when the electric parking brake 100 is in an idle state, a clearance 50 is formed between the first lining 22 and the first end surface 210 and between the second lining 24 and the second end surface 220. Hence, rotation of the brake disk 200 is allowed.

Figure 5:
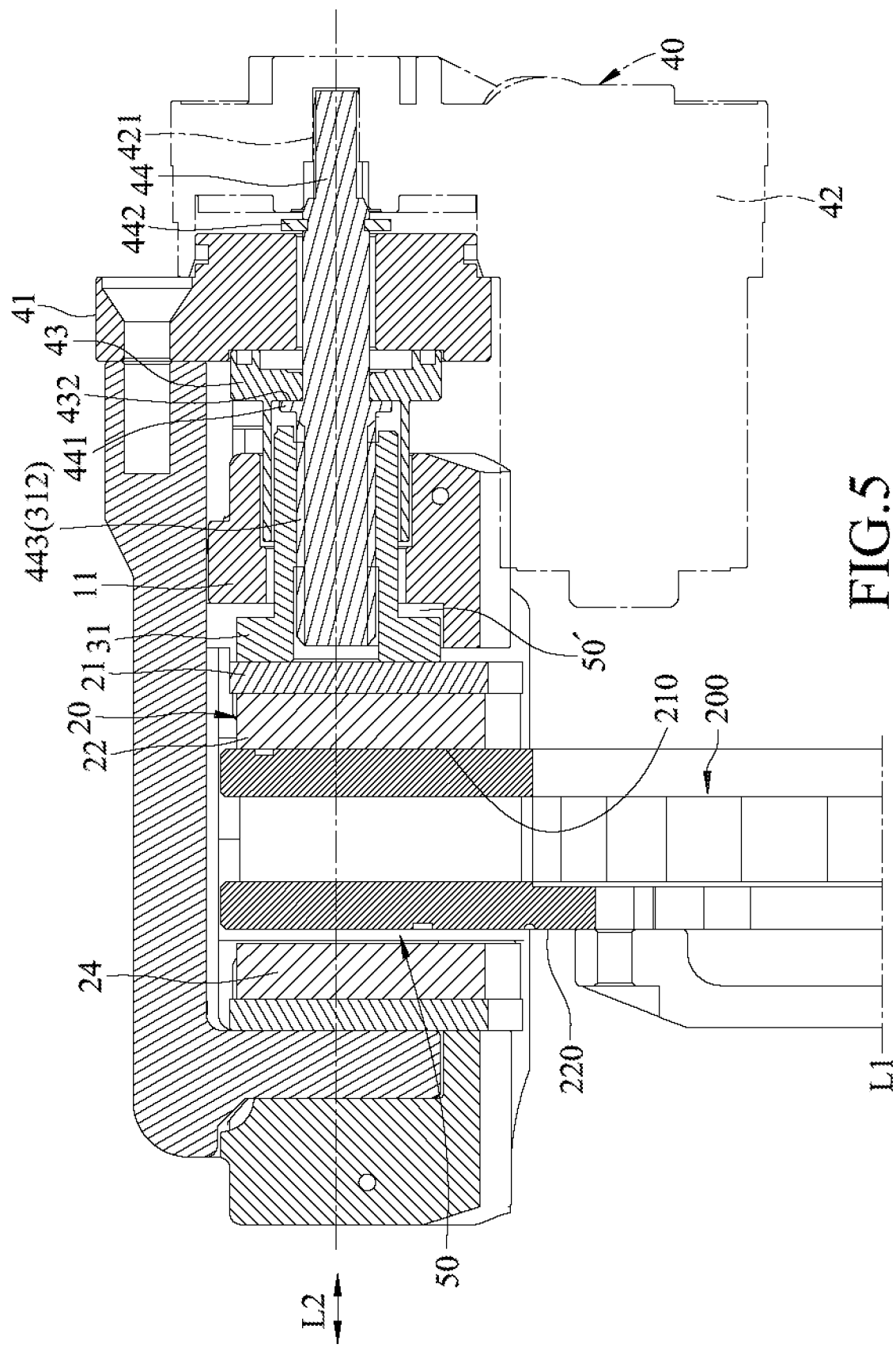
FIG. 5 is a schematic sectional view of the preferred embodiment, illustrating that first lining is in contact with the brake disk, while the second lining is not in contact with the brake disk.

With particular reference to FIG. 5, when parking is desired, the actuator 42 of the actuating unit 40 is actuated so that the driving portion 421 drives rotation of the driving shaft 44 in a forward direction. Due to engagement between the threaded portion 443 and the threaded hole 312, rotation of the driving shaft 44 results in movement of the first braking member 31 toward the brake disk 200. Hence, the first lining 22 is moved together with the first positioning member 21 to contact the first end surface 210. In other words, the clearance 50 between the first lining 22 and the first end surface 210 disappears. At this time, another clearance 50' occurs between the first side seat 11 and the first braking member 31, and the clearance 50 between the second lining 24 and the second end surface 220 remains.

Figure 6:
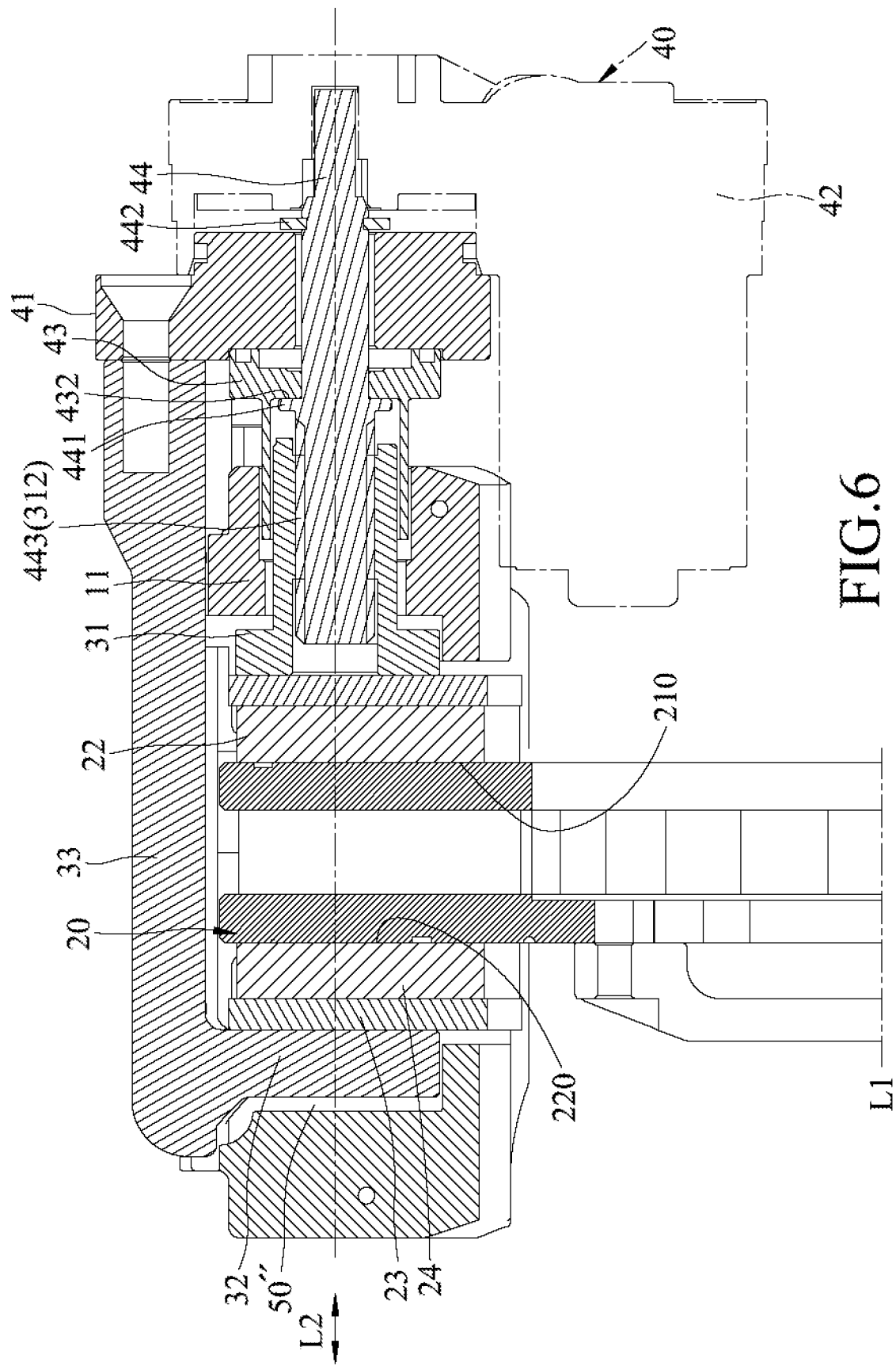
FIG. 6 is a schematic sectional view of the preferred embodiment, illustrating that the first and second linings are in contact with the brake disk.

With particular reference to FIG. 6, when the first lining 22 comes into contact with the first end surface 210, since rotation of the driving shaft 44 is continued, the driving shaft 44 is moved relative to the first braking member 31 in a direction away from the brake disk 200 (i.e., in FIG. 6, in a rightward direction). At the same time, all of the support 41, the bushing 43, the connecting member 33, and the second braking member 32 are co-move with the driving shaft 44 along the axial direction L2 by virtue of the guiding action of the guide rods 113 and the guide holes 412, so that the second positioning member 23 moves the second lining 24 to contact the second end surface 220, thereby clamping the brake disk 200 between the first and second linings 22, 24. At this time, the clearance 50 between the second lining 24 and the second end surface 220 disappears, and another clearance 50" occurs between the second side seat 12 and the second braking member 32.

Subsequently, the actuator 42 can be actuated again to drive rotation of the driving shaft 44 in a reverse direction to thereby allow the first and second linings 22, 24 to return from braking positions shown in FIG. 5 to idle positions shown in FIG. 3.

As such, the electric parking brake 100 can be switched between a parking state and an idle state by simply operating the actuator 42. That is, the electric parking brake 100 is convenient to operate.

It should be noted that, the actuator 42 may be configured as one of a solenoid and a pressure cylinder that are not shown. It this occurs, only movement of the driving shaft 44 is required. That is, rotation is not required for the driving shaft 44 relative to the main body unit 10.

With this invention thus explained, it is apparent that numerous modifications and variations can be made without departing from the scope and spirit of this invention. It is therefore intended that this invention be limited only as indicated by the appended claims.

I claim:

1. An electric parking brake adapted for use with a brake disk, the brake disk having a rotating axis and opposite first and second end surfaces perpendicular to the rotating axis, said electric parking brake comprising:
   a main body unit including first and second side seats adapted to be located respectively at two sides of the brake disk and adjacent respectively to the first and second end surfaces, said first side seat having a first recess adapted to be disposed in proximity to the first end surface, said second side seat having a second recess adapted to be disposed in proximity to the second end surface;
   a lining unit including a first positioning member movable in said first recess along an axial direction parallel to said rotating axis, a first lining secured on said first positioning member, a second positioning member movable in said second recess along said axial direction, and a second lining secured on said second positioning member, said first and second linings being adapted to be adjacent respectively to the first and second end surfaces;
   a braking unit including a first braking member movable in said first recess along said axial direction, a second braking member movable in said second recess along said axial direction, and a connecting member connected to said second braking member; and
   an actuating unit including a support connected to said connecting member, an actuator mounted on said support, and a driving shaft extending along said axial direction and driven by said actuator to move said first braking member relative to said main body unit, said driving shaft having a threaded portion that is threaded to said first braking member such that, through operation of said actuator, said first lining is driven by said first braking member to move toward or away from the first end surface in a direction to thereby move said second braking member to move toward or away from the second end surface in an opposite direction, so that said first and second linings can be moved toward each other to clamp the brake disk therebetween;
   wherein said second braking member and said connecting member of said braking unit are formed as one piece, said support being connected fixedly to said connecting member, one of said first side seat and said support having two guide holes, the other of said first side seat and said support including two guide rods that are inserted respectively and movably into said guide holes and that extend along said axial direction, so as to guide movement of said support on said first side seat along said axial direction;
   wherein said first side seat is formed with a shaft hole extending along said axial direction, said driving shaft of said actuating unit extending through said shaft hole in said first side seat along said axial direction; and
   wherein said actuating unit further includes a bushing disposed on said support in such a manner that movement of said bushing on said support along said axial direction is prevented, said driving shaft extending rotatably through said bushing, each of said bushing and said driving shaft having a flange, said flanges of said bushing and said driving shaft abutting against each other so as to allow for synchronous movement of said flanges during rotation of said driving shaft relative to said main body unit.

2. The electric parking brake as claimed in claim 1 wherein said bushing has a sleeve tube portion, said first braking member having an extension tube portion that extends along said axial direction and into said sleeve tube portion of said bushing.

* * * * *